US00RE44224E

(19) United States
(12) Reissued Patent
Wang et al.

(10) Patent Number: US RE44,224 E
(45) Date of Reissued Patent: *May 21, 2013

(54) SURFACE-MOUNTED OVER-CURRENT PROTECTION DEVICE

(75) Inventors: Shau Chew Wang, Taipei (TW); Fu Hua Chu, Taipei (TW)

(73) Assignee: Polytronics Technology Corp., Hsinchu (TW)

( * ) Notice: This patent is subject to a terminal disclaimer.

(21) Appl. No.: 13/353,161

(22) Filed: Jan. 18, 2012

Related U.S. Patent Documents

Reissue of:
(64) Patent No.: 8,044,763
Issued: Oct. 25, 2011
Appl. No.: 12/700,775
Filed: Feb. 5, 2010

U.S. Applications:
(63) Continuation-in-part of application No. 11/478,604, filed on Jul. 3, 2006, now Pat. No. 7,701,322.

(30) Foreign Application Priority Data

Dec. 27, 2005 (TW) ..... 094146660

(51) Int. Cl.
*H01C 7/10* (2006.01)

(52) U.S. Cl.
USPC ..... 338/22 R; 338/332; 338/328; 338/25; 252/512

(58) Field of Classification Search ..... 338/22 R, 338/332, 25
See application file for complete search history.

(56) References Cited

U.S. PATENT DOCUMENTS

| | | | | | |
|---|---|---|---|---|---|
| 4,724,417 | A * | 2/1988 | Au et al. | 338/22 R |
| 4,786,888 | A * | 11/1988 | Yoneda et al. | 338/22 R |
| 4,980,541 | A | 12/1990 | Shafe et al. | |
| 5,378,407 | A | 1/1995 | Chandler et al. | |
| 5,747,147 | A * | 5/1998 | Wartenberg et al. | 428/209 |
| 5,900,800 | A * | 5/1999 | McGuire et al. | 338/22 R |
| 6,104,587 | A * | 8/2000 | Banich et al. | 361/106 |
| 6,172,591 | B1 * | 1/2001 | Barrett | 338/22 R |
| 6,223,423 | B1 * | 5/2001 | Hogge | 29/621 |

(Continued)

FOREIGN PATENT DOCUMENTS

| | | | |
|---|---|---|---|
| CN | 1150314 | A | 5/1997 |
| CN | 1182942 | A | 5/1998 |

(Continued)

*Primary Examiner* — Kyung Lee
(74) *Attorney, Agent, or Firm* — WPAT, P.C.; Anthony King

(57) ABSTRACT

A surface-mounted over-current protection device with positive temperature coefficient (PTC) behavior is disclosed. The surface-mounted over-current protection device comprises a first metal foil, a second metal foil corresponding to the first metal foil, a PTC material layer stacked between the first metal foil and the second metal foil, a first metal electrode, a first metal conductor electrically connecting the first metal foil to the first metal electrode, a second metal electrode corresponding to the first metal electrode, a second metal conductor electrically connecting the second metal foil to the second metal electrode, and at least one insulated layer to electrically insulate the first metal electrode from the second metal electrode. The surface-mounted over-current protection device, at 25° C., indicates that a hold current thereof divided by the product of a covered area thereof and the number of the conductive composite module is at least 0.16 A/mm$^2$.

19 Claims, 5 Drawing Sheets

U.S. PATENT DOCUMENTS

| | | | | |
|---|---|---|---|---|
| 6,225,610 | B1 * | 5/2001 | Walsh | 219/505 |
| 6,236,302 | B1 * | 5/2001 | Barrett et al. | 338/22 R |
| 6,242,997 | B1 * | 6/2001 | Barrett et al. | 338/22 R |
| 6,377,467 | B1 * | 4/2002 | Chu et al. | 361/767 |
| 6,522,237 | B1 * | 2/2003 | Ito et al. | 338/22 R |
| 6,656,304 | B2 * | 12/2003 | Furuta et al. | 156/216 |
| 6,987,440 | B2 * | 1/2006 | Becker et al. | 338/22 R |
| 7,001,538 | B2 * | 2/2006 | Lee et al. | 252/511 |
| 7,053,748 | B2 * | 5/2006 | Chiang et al. | 338/22 R |
| 7,286,038 | B1 * | 10/2007 | Wang et al. | 338/22 R |
| 7,343,671 | B2 * | 3/2008 | Hetherton et al. | 29/610.1 |
| 2002/0130757 | A1 | 9/2002 | Huang et al. | |
| 2005/0140492 | A1 | 6/2005 | Chu et al. | |
| 2007/0146112 | A1 | 6/2007 | Wang et al. | |

FOREIGN PATENT DOCUMENTS

| | | | |
|---|---|---|---|
| CN | 2470923 | Y | 1/2002 |
| CN | 1421040 | A | 5/2003 |
| JP | 11329375 | A | 11/1999 |

* cited by examiner

SURFACE-MOUNTED OVER-CURRENT PROTECTION DEVICE

Matter enclosed in heavy brackets [ ] appears in the original patent but forms no part of this reissue specification; matter printed in italics indicates the additions made by reissue.

CROSS-REFERENCE TO A RELATED APPLICATION

This application is a Continuation-In-Part (CIP) of U.S. patent application Ser. No. 11/478,604 filed on Jul. 3, 2006 *now U.S. Pat. No. 7,701,322*.

BACKGROUND OF THE INVENTION

1. Field of the Invention

The present invention relates to a surface-mounted over-current protection device and more particularly, to a surface-mounted over-current protection device exhibiting a small covered area, high hold current, and positive temperature coefficient (FTC) behavior.

2. Description of the Prior Art

The resistance of a PTC conductive composite is sensitive to temperature change. When a PTC device containing PTC conductive composite operates at room temperature, its resistance remains at a low value so that the circuit elements can operate normally. However, if an over-current or an over-temperature situation occurs, the resistance of the PTC device will immediately increase at least ten thousand times (over $10^4$ ohm) to a high resistance state. Therefore, the over-current will be counterchecked and the objective of protecting the circuit elements or batteries is achieved. Because the PTC device can be used to effectively protect electronic applications, it has been commonly integrated into various circuits to prevent over-current damage.

In general, the PTC conductive composite contains at least one crystalline polymer and conductive filler. The conductive filler is dispersed uniformly in the crystalline polymer(s). The crystalline polymer is mainly a polyolefin polymer or a fluoropolyolefin polymer such as polyethylene, polyvinyl fluoride or polyvinylidene difluoride (PVDF). The conductive filler(s) is mainly carbon black.

The conductivity of the PTC conductive composite depends on the content and type of the conductive fillers. In general, the resistivity of the PTC conductive composite containing the carbon black as the conductive filler seldom reaches below 0.2 Ω-cm. Even though the low resistivity mentioned above is achieved, the PTC conductive composite often loses the characteristic of voltage endurance. Therefore, a conductive filler, which is different from carbon black, with lower resistance should be used in the to PTC conductive composite to reach a resistivity below 0.2 Ω-cm. Since the conductivity of carbon black is relatively low (i.e., relatively high resistance), if carbon black is applied to a surface mount device (SMD) with fixed covered area, the hold current of the SMD is limited to certain level due to the resistance limitation of carbon black. The hold current mentioned above means a maximum current the PTC device can endure without trip at a specific temperature.

Although a multi-layer PTC structure could be used to increase the hold current, SMD device performance is eventually limited due to the limitation of total height as well as the number of PTC layers of the SMD device. In general, for a single PTC layer of carbon black filled SMD over-current protection device, the ratio of the hold current to the area of a PTC material layer should not exceed 0.16 A/mm$^2$. The SMDs currently available on the market have a certain shape characterized by the width and the length, which are defined as a form factor in the specification of the SMD. Consequently, the length and width of the SMD determine the covered area of the SMD. For example, SMD1812 indicates a SMD with a length of 0.18 inches and a width of 0.12 inches and thus a covered area of 0.18"×0.12", equivalent to 4.572 mm×3.048 mm (i.e., 13.9355 mm$^2$) in metric system. For an SMD 1812 equipped with an over-current protection device using carbon black as the conductive filler, a single PTC material layer hardly reaches a hold current of 1.8 A. If the SMD1812 having two PTC material layers can hold a current of 3.6 A, the hold current per unit covered area per PTC material layer can be calculated as: 3.6 A/(2×13.9355 mm$^2$) =0.129 A/mm$^2$, which is below 0.16 A/mm$^2$. Therefore, it is highly desirable that a new type of SMD device could be developed to exceed the 0.16 A/mm$^2$ barrier.

SUMMARY OF THE INVENTION

The objective of the present invention is to provide a surface-mounted over-current protection device, in which conductive filler of high conductivity is utilized. This enables the surface-mounted over-current protection device to exhibit excellent resistivity, voltage endurance, resistance repeatability, and a high hold current.

In order to achieve the above objective, the present invention discloses a surface-mounted over-current protection device. One embodiment of the present invention comprises a first metal foil, a second metal foil parallel to the first metal foil, a PTC material layer, a first metal electrode, a first metal conductor electrically connecting the first metal foil to the first metal electrode, a second metal electrode corresponding to the first metal electrode, a second metal conductor electrically connecting the second metal foil to the second metal electrode, and at least one insulated layer electrically insulating the first metal electrode and the second metal electrode. The PTC material layer is stacked between the first metal foil and the second metal foil to form a conductive composite module. Each of the first and the second metal foils uses a rough surface with plural nodules to physically contact the PTC material layer, in which the rough surfaces of the first and the second metal foils face toward each other and contact the top surface and the bottom surface of the PTC material layer, respectively. The PTC material layer comprises at least one crystalline polymer and at least one metal powder (or conductive ceramic powder). The surface-mounted over-current protection device of the present invention, at 25° C., indicates that the hold current thereof divided by the product of the covered area thereof and the number of the PTC material layers is from 0.16 A/mm$^2$ to 1 A/mm$^2$.

Another embodiment of the present invention comprises a plurality of conductive composite modules that are stacked. A first insulated layer is disposed between each pair of the conductive composite modules. In the current embodiment, the surface-mounted over-current protection device indicates that the hold current thereof divided by the product of the covered area thereof and the number of the PTC material layers is at least 0.16 A/mm$^2$ and at most 1 A/mm$^2$ at 25° C. The first insulated layer, which comprises epoxy resin and glass fiber, also acts an adhesive to bond each pair of the conductive composite modules together. The epoxy resin in the second insulated layer can be replaced with other adhesive insulated layers such as Nylon, polyvinylacetate, polyester and polyimide. The second insulated layer, which is disposed between first and second metal electrodes, could be a heat-curing acrylic resin or UV-light-curing acrylic resin.

In the present invention, the first and the second metal foils are thermal-pressed to stick on the top surface and the bottom surface of the PTC material layer, respectively. Each metal foil consists of a shinny (smooth) side and a matt (rough) side. The rough surface with nodules of each metal foil is used to contact physically the top surface or the bottom surface of the PTC material layer. The metal foil could be a copper foil, a nickel-plated copper foil, or a nickel foil.

The surface-mounted over-current protection device of the present invention is suitable for various sizes of SMDs and more particularly to SMDs of small size; that is, SMDs with the covered area below 50 $mm^2$, even below 25 $mm^2$. The hold current is device size dependent. The smaller size SMD could hold less current, and the larger size SMD could hold higher current. The low resistance SMD prepared from this invention could hold at most 20 A.

In general, when the PTC material reaches a resistivity below 0.2 Ω-cm, it usually cannot endure a voltage above 12V. To substantially improve the voltage endurance, a non-conductive filler can be added into the PTC material layer and the thickness of the PTC material layer is made over 0.2 mm to improve the voltage endurance over 12V. The non-conductive filler is mainly an inorganic compound with a hydroxyl group and limits the trip jump $R_1/R_i$ to below 3, in which $R_i$ is the initial to resistance and $R_1$ is the resistance measured one hour later after a trip back to room temperature.

With the relatively low resistivity (i.e., below 0.2 Ω-cm) of the PTC material layer, the covered area of the surface-mounted over-current protection device of the present invention can be shrunk below 50 $mm^2$, preferably below 25 $mm^2$ (corresponding to the SMDs with form factor of 1812, 1210, 1206, 0805, 0603, or 0402), and the objectives of low resistance and high hold current can still be achieved.

BRIEF DESCRIPTION OF THE DRAWINGS

The invention will be described according to the appended drawings in which.

DETAILED DESCRIPTION OF THE INVENTION

The following will describe embodiments of the surface-mounted over-current protection device of the present invention including the structures, compositions, and manufacturing methods of the embodiments.

Figure 1:
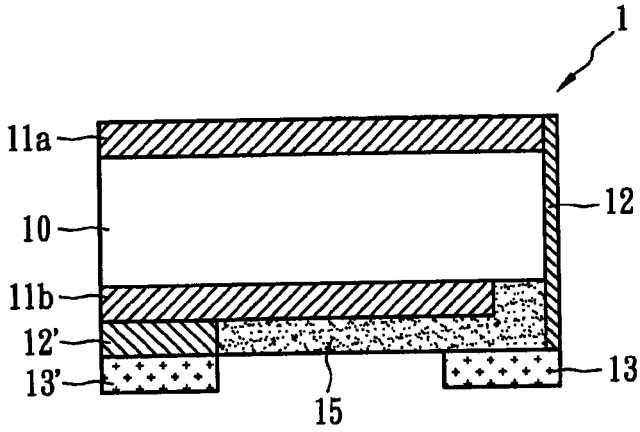
FIGS. 1-8 illustrate each embodiment of the surface-mounted over-current protection device of the present invention.

FIG. 1 illustrates the first embodiment of the surface-mounted over-current protection device 1, which is suitable to adhere to a substrate (not shown). A first metal electrode 13 and a second metal electrode 13' corresponding to the first metal electrode 13 are usually located on the same plane. The surface-mounted over-current protection device 1 could be designed to contain only one electrode set comprising the first metal electrode 13 and the second metal electrode 13' such that only one surface thereof could adhere to the surface of the substrate. The design in FIG. 1 is usually applied to a narrow space and meets the requirements of one-way heat conduction or one-way heat insulation. In the current embodiment, the first metal electrode 13, a first metal conductor 12, a first metal foil 11a, a PTC material layer 10, a second metal foil 11b, a second metal conductor 12', and the second metal electrode form a conductive circuit to connect an external device (not shown) and a power source (not shown). In addition, an insulated layer 15 is used to electrically insulate the first metal electrode 13 from the second metal electrode 13'.

Figure 2:
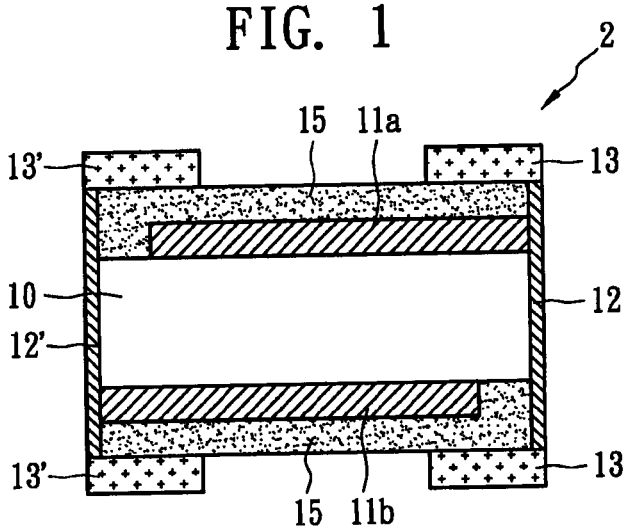

FIG. 2 illustrates the second embodiment of the surface-mounted over-current protection device 2, which is designed to contain two electrode sets, each comprising the first metal electrode 13 and the second metal electrode 13' on the top surface thereof and the bottom surface thereof, respectively. Thus, the first and second metal electrodes 13 and 13' form a positive electrode and a negative electrode on the top surface and the bottom surface of the surface-mounted over-current protection device 2 such that either of the top and the bottom surfaces could be used to adhere to the surface of the substrate. Therefore, there is no up-and-down direction concern during the design, and the manufacturing process (e.g., the selection of resistors, device packaging, device assembly and the manufacturing process of the printed circuit board) is simplified. Similar to the first embodiment, the second embodiment employs an insulated layer 15 to electrically insulate the first metal electrode 13 from the second metal electrode 13'.

Figure 3:
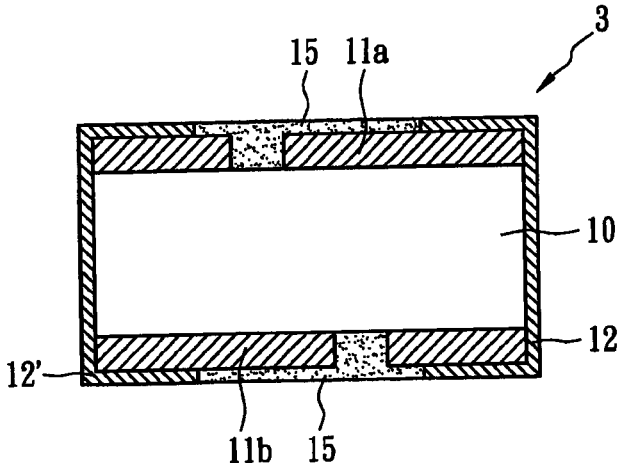

FIG. 3 illustrates the third embodiment of the surface-mounted over-current protection device 3, in which the first metal conductor 12 and the second metal conductor 12' are developed by metallic electroplating on surfaces of the surface-mounted over-current protection device 3 to form wrap-around electrical conductors. In addition, the first and the second metal conductors 12 and 12' could be connected to the first and the second metal foils 11a and 11b and metal electrodes (not shown) by soldering, electroplating, and then reflow or heat-curing. In the current embodiment, the first and the second metal conductors 12 and 12' can also be formed by first forming micro holes and then plating-through-hole or metal filling.

Figure 4:
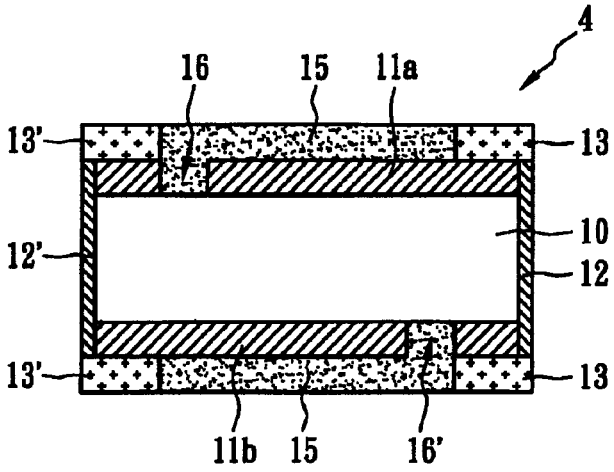

FIG. 4 illustrates the fourth embodiment of the surface-mounted over-current protection device 4, in which the first metal conductor 12 and the second metal conductor 12' combine the first metal electrode 13 and the second metal electrode 13', respectively, to directly form metal electrodes. The first metal foil 11a is formed by etching and is electrically insulated from the second metal electrode 13' and the second metal conductor 12' by an etching line 16 (or etching area). Similarly, the second metal foil 11b is formed by etching and is electrically insulated from the first metal electrode 13 and the first metal conductor 12 by an etching line 16' (or etching area).

Figure 5:
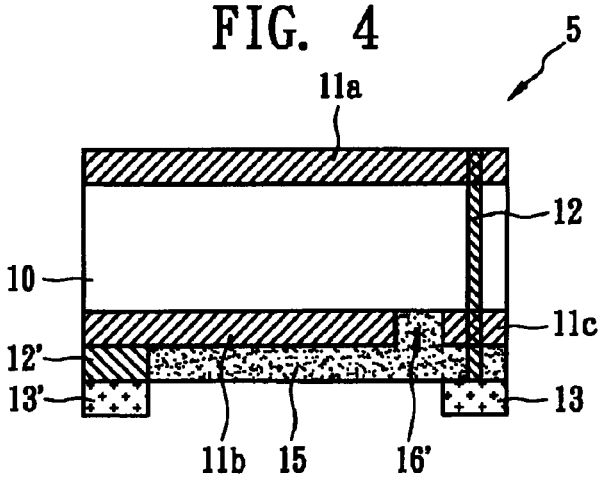

FIG. 5 illustrates the fifth embodiment of the surface-mounted over-current protection device 5, in which the first metal conductor 12 electrically connects the first metal foil 11a and a third metal foil 11c through a conductive through-hole, and the third metal foil 11c is formed by etching and is electrically insulated from the second metal foil 11b by an etching line 16' (or etching area). Additionally, the third metal foil 11c, which adheres to the PTC material layer 10, and the second metal foil 11b are located on the same plane.

Figure 6:
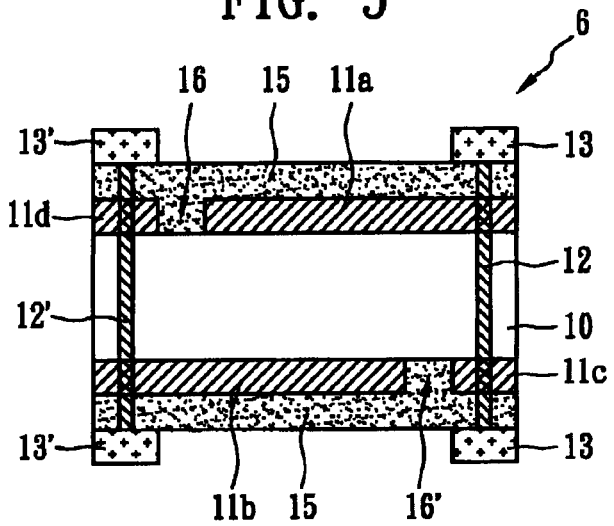
Figure 7:
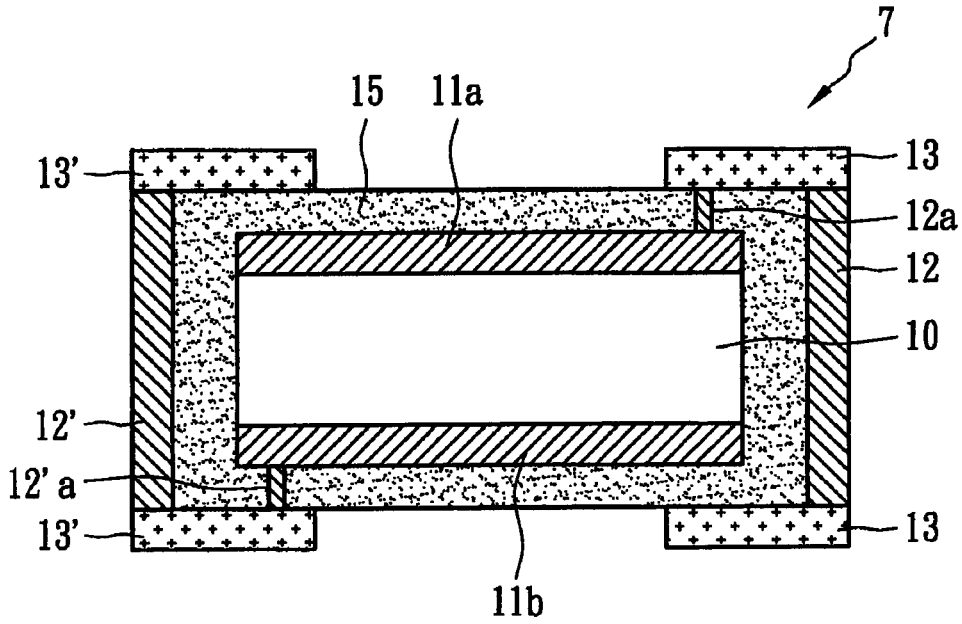
Figure 8:
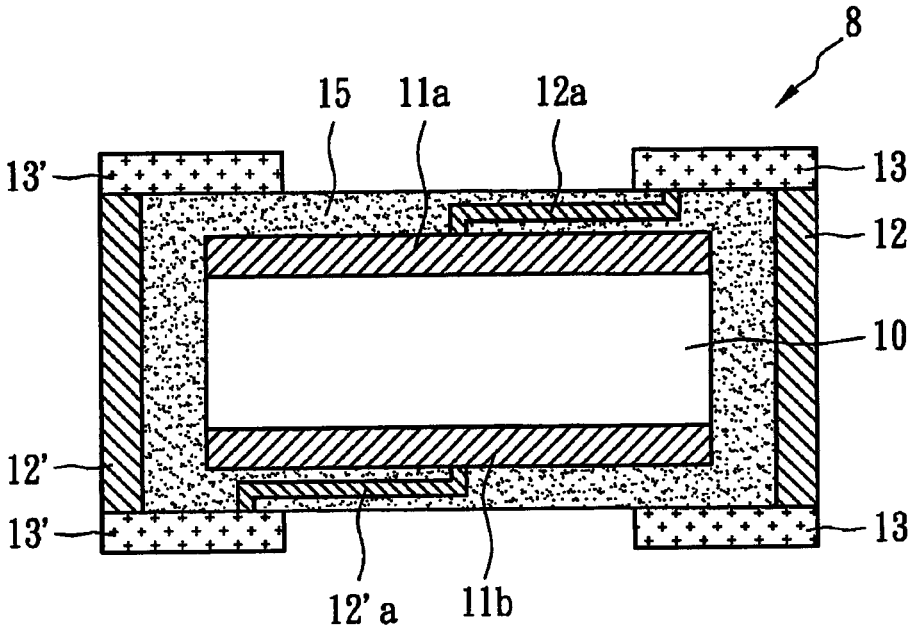

FIG. 6 illustrates the sixth embodiment of the surface-mounted over-current protection device 6, in which the second metal conductor 12' electrically connects the second metal foil 11b and a fourth metal foil 11d through a conductive through-hole, and the fourth metal foil 11d is formed by etching and is electrically insulated from the first metal foil 11a by an etching line 16 (or etching area). In addition, the fourth metal foil 11d, which adheres to the PTC material layer 10, and the first metal foil 11a are located on the same plane. In other embodiments, the first and the second metal foils 11a and 11b do not need to be etched; the first metal electrode 13 is directly connected to the first metal foil 11a through a third metal conductor 12a; the second metal electrode 13' is connected to the second metal foil 11b through a fourth metal conductor 12'a (refer to FIGS. 7 and 8).

The compositions and the resistivity (ρ) of the PTC material layer 10 used in the surface-mounted over-current protection device are shown in Table 1 below.

TABLE 1

| | HDPE (g) | LDPE (g) | Nickel Powder (g) | Titanium Carbide (TiC) (g) | Carbon Black (g) | Magnesium Hydroxide Mg(OH)2 (g) | Resistivity ρ (Ω-cm) |
|---|---|---|---|---|---|---|---|
| Example I | 15.00 | — | — | 117.60 | — | — | 0.0082 |
| Example II | 15.00 | — | — | 117.60 | — | — | 0.0082 |
| Example III | 15.00 | — | — | 117.60 | — | — | 0.0082 |
| Example IV | 11.90 | 4.12 | 79.30 | — | — | 4.68 | 0.0100 |
| Example V | 14.00 | — | — | 117.60 | — | — | 0.0065 |
| Example VI | 14.00 | — | — | 117.60 | — | — | 0.0068 |
| Example VII | 14.00 | — | — | 117.6 | — | — | 0.0062 |
| Example VIII | 14.00 | — | — | 117.6 | — | — | 0.0060 |
| Example IX | 14.00 | — | — | 117.6 | — | — | 0.0065 |
| Comparative Example I | 25.80 | — | — | — | 34.20 | — | 0.2060 |
| Comparative Example II | 25.80 | — | — | — | 34.20 | — | 0.2060 |

The components in Table 1 are described below. The HDPE (high density polyethylene) employs TAISOX HDPE/8010 (with a density of 0.956 g/cm$^3$, and a melting point of 134° C.), a product of Formosa Plastics Corporation. The LDPE (low density polyethylene) employs LDPE/6330F (with a density of 0.924 g/cm$^3$, and a melting point of 113° C.), a product of Formosa Plastics Corporation. The Magnesium Hydroxide employs UD-650, a product of Ube Material Industries, Ltd. The carbon black employs Raven 430U of Columbian Chemical Company. The nickel powder employs NI-102 (with a form of flake, a particle size of 3 μm, and a resistivity ranging from 6 μΩ-cm to 15 μΩ-cm) of Atlantic Equipment Engineers. The titanium carbide employs TI-301 (with a resistivity ranging from 180 μΩ-cm to 250 μΩ-cm) of Atlantic Equipment Engineers.

The manufacturing method of the surface-mounted over-current protection device of the present invention is given as follows. The raw material is set into a blender (Hakke-600) at 160° C. for 2 minutes. The procedures of feeding the material are as follows: The HDPE or LDPE with the amounts according to Table 1 is first loaded into the Haake blender till the polymer is fully melted. The conductive fillers (e.g., nickel powder, titanium carbide, or carbon black) or the non-conductive filler (e.g., magnesium hydroxide) are then charged into the blender. The rotational speed of the blender is set to 40 rpm. After 3 minutes' blending, the rotational speed increases to 70 rpm. After blending for 7 minutes, the mixture in the blender is drained and thereby a conductive composition with a positive temperature coefficient behavior is formed. Afterward, the above conductive composition is loaded into a mold to form a symmetrical PTC lamination structure with the following layers: steel plate/Teflon is cloth/nickel foil/PTC compound (i.e., the conductive composition)/nickel foil/Teflon cloth/steel plate. First, the mold loaded with the conductive composition is pre-pressed for 3 minutes at 50 kg/cm$^2$, 160° C. This pre-press process could exhaust the gas generated from vaporized moisture or from some volatile ingredients in the PTC lamination structure. The pre-press process could also drive the air pockets out from the PTC lamination structure. As the generated gas is exhausted, the mold is pressed for additional 3 minutes at 100 kg/cm$^2$, 160° C. After that, the press step is repeated once at 150 kg/cm$^2$, 160° C. for 3 minutes to form a PTC composite layer.

The conductive fillers are not limited to those used in the above embodiments and any conductive fillers can be used in the surface-mounted over-current protection device of the present invention if it exhibits the following properties: (1) the particle size distribution ranging from 0.01 μm to 30 μm, preferably from 0.1 μm to 10 μm; (2) the aspect ratio of the particle below 500; and (3) the resistivity below 500 μΩ-cm. Accordingly, if the conductive filler is a metal powder, it could be nickel, copper, iron, tin, lead, silver, gold, platinum, or an alloy thereof. If the conductive filler is a conductive ceramic powder, it could be titanium carbide (TiC), tungsten carbide (WC), vanadium carbide (VC), zirconium carbide (ZrC), niobium carbide (NbC), tantalum carbide (TaC), molybdenum carbide (MoC), hafnium carbide (HfC), titanium boride ($TiB_2$), vanadium boride ($VB_2$), zirconium boride ($ZrB_2$), niobium boride ($NbB_2$), molybdenum boride ($MoB_2$), hafnium boride ($HfB_2$), or zirconium nitride (ZrN).

Figure 9A:
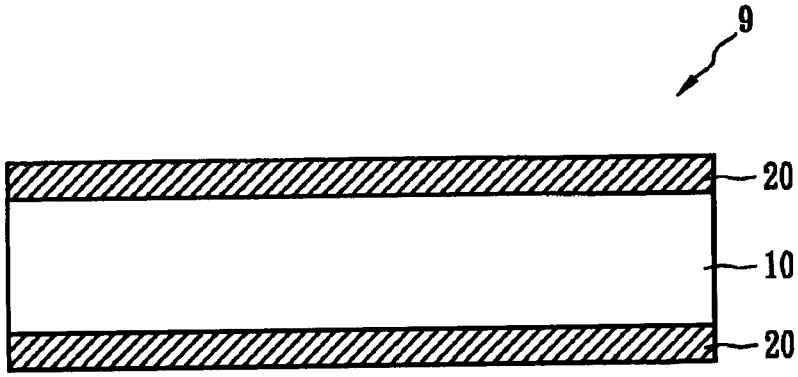
FIGS. 9(a)-9(c) illustrate the manufacturing method of one embodiment of the present invention.

Referring to FIG. 9(a), the PTC composite layer is cut to form plural PTC material layers 10, each with the size of 20×20 cm$^2$, and two metal foils 20 physically contact the top surface and the bottom surface of the PTC material layer 10, in which the two metal foils 20 are symmetrically placed upon the top surface and the bottom surface of the PTC material layer 10. Each metal foil 20 uses a rough surface with plural nodules (not shown) to physically contact the PTC material layer 10. Next, two Teflon cloths (not shown) are placed upon the two metal foils 20. Then, two steel plates (not shown) are placed upon the two Teflon cloths. As a result, all of the Teflon cloths and the steel plates are disposed symmetrically on the top and the bottom surfaces of the PTC material layer 10 and a multi-layered structure is formed. The multi-layered structure is then pressed for 3 minutes at 60 kg/cm$^2$, 180° C., and is then pressed at the same pressure at room temperature for 5 minutes. After the steps of pressing process, the multi-layered structure experiences a gamma-ray radiation of 50 KGy to form a conductive composite module 9, as shown in FIG. 9(a).

Figure 9B:
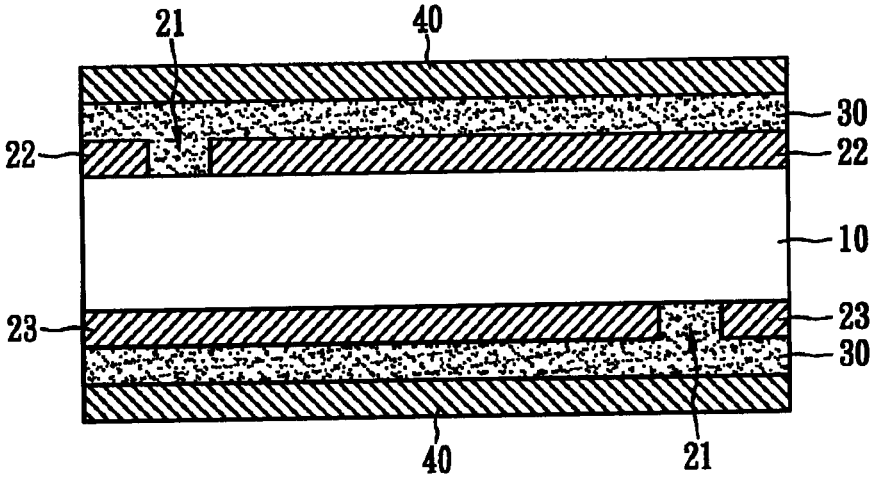

For Example I, Example IV, Example V, and Comparative Example I in Table 1, the metal foils 20 of the above conductive composite module 9 are etched to form two etching lines 21 (refer to FIG. 9(b)), a first metal foil 22, and a second metal foil 23. Then, a first insulated layer 30 (the epoxy resin containing glass fiber is used these three examples) is applied to the first and the second metal foils 22 and 23, and then a copper foil 40 is applied to the first insulated layer 30. Again, a thermal pressing is performed at 60 kg/cm$^2$, 180° C. for 30 minutes and a composite material layer comprising one PTC material layer 10 is formed, shown in FIG. 9(b).

For Example VI, Example VII, Example VIII, and Example IX in Table 1, the titanium carbide filler is prepared with 4 hours grinding time to form larger size filler and the filler is filtered through 400 mesh screen. Same as Example I to Example V, the metal foils 20 of the above conductive composite module 9 are etched to form two etching lines 21 (refer to FIG. 9(b)), a first metal foil 22, and a second metal foil 23. Then, a first insulated layer 30 (the epoxy resin containing glass fiber is used these three examples) is applied to the first and the second metal foils 22 and 23, and then a copper foil 40 is applied to the first insulated layer 30. Again, a thermal pressing is performed at 60 kg/cm$^2$, 180° C. for 30 minutes and a composite material layer comprising one PTC material layer 10 is formed, shown in FIG. 9(b).

Figure 9C:
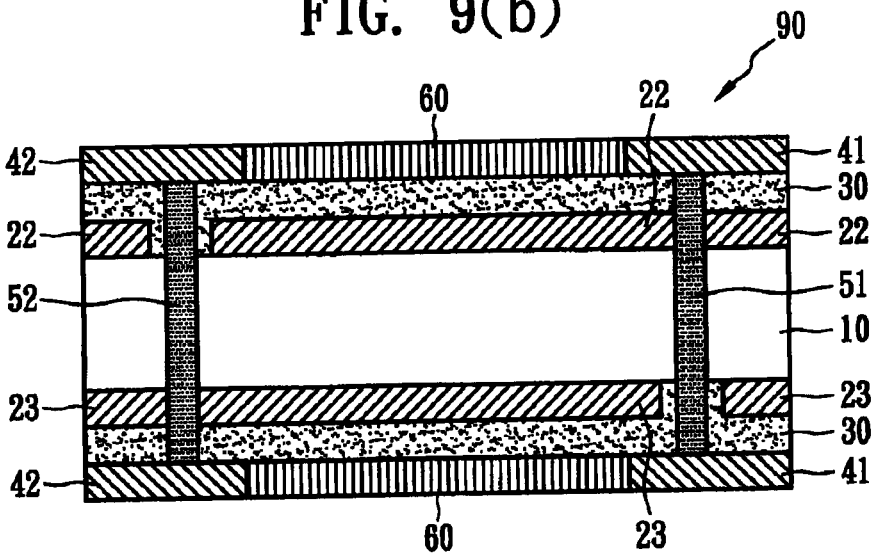

Referring to FIG. 9(c), the copper foil 40 is etched to form a first metal electrode 41 and a second metal electrode 42 corresponding to the first metal electrode 41, in which a first metal conductor 51 and a second metal conductor 52 are formed by plating-through-hole (PTH). The first metal conductor 51 electrically connects the first metal foil 22 to the first metal electrode 41, and the second metal conductor 52 electrically connects the second metal foil 23 to the second metal electrode 42. Afterward, a second insulated layer 60 (a UV-light-curing paint is used in these three examples) is disposed between the first metal electrode 41 and the second metal electrode 42 to electrically insulate the first metal electrode 41 from the second metal electrode 42. Accordingly, a PTC plate is formed. After curing by UV light, the PTC plate is cut according to the covered area of the SMD and the surface-mounted over-current protection device 90 of the present invention is formed.

In addition to the four examples comprising only one PTC material layer 10, the present invention comprises other embodiments containing at least one PTC material layer 10. The size, hold current, hold current per unit covered area per PTC material layer (Ih/(Area×N)) are shown in Table 2 below.

TABLE 2

| | Surface-Mounted Over-Current Protection Device | | | | | |
|---|---|---|---|---|---|---|
| | Number of PTC material layers (N) | Length (mm) | Width (mm) | Covered Area (mm$^2$) | Hold Current Ih (A) | Ih/(Area × N) (A/mm$^2$) |
| Example I | 1 | 3.05 | 1.52 | 4.64 | 1.0 | 0.215 |
| Example II | 2 | 3.05 | 1.52 | 4.64 | 1.7 | 0.183 |
| Example III | 4 | 3.05 | 1.52 | 4.64 | 3.0 | 0.161 |
| Example IV | 1 | 2.03 | 1.27 | 2.58 | 0.5 | 0.194 |
| Example V | 1 | 4.57 | 3.05 | 13.94 | 5.2 | 0.373 |
| Example VI | 1 | 3.05 | 1.52 | 4.64 | 3.5 | 0.754 |
| Example VII | 1 | 3.05 | 1.52 | 4.64 | 4.3 | 0.926 |
| Example VIII | 1 | 2.02 | 1.25 | 2.53 | 2.5 | 0.988 |
| Example IX | 1 | 2.02 | 1.25 | 2.53 | 2.2 | 0.869 |
| Comparative Example I | 1 | 3.05 | 1.52 | 4.64 | 0.5 | 0.107 |
| Comparative Example II | 4 | 3.05 | 1.52 | 4.64 | 1.6 | 0.086 |

Figure 10:
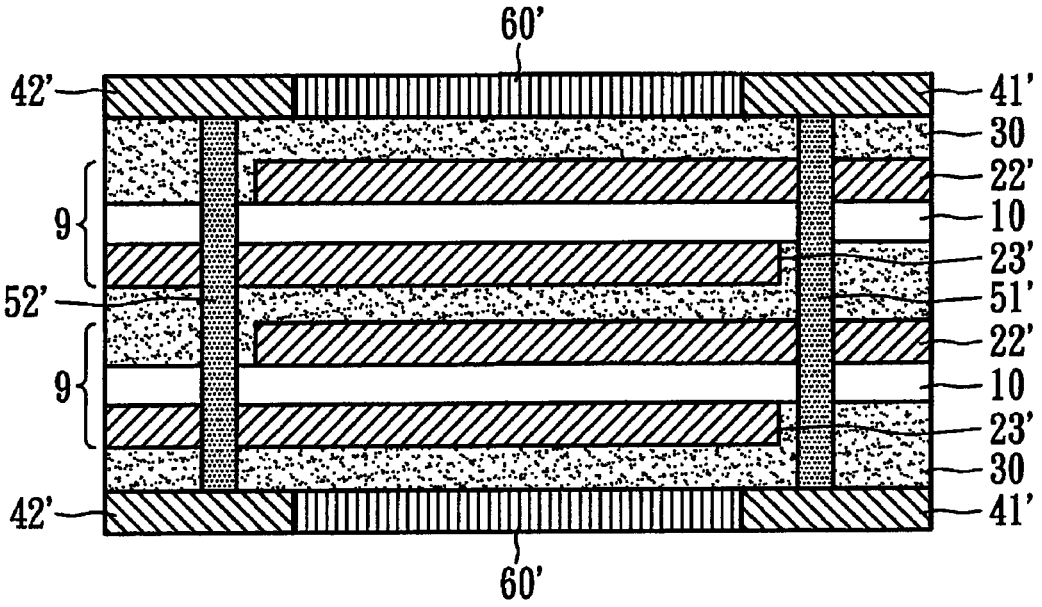
FIG. 10 illustrates the surface-mounted over-current protection device of the present invention with two PTC material layers.

FIG. 10 illustrates the structure of the surface-mounted over-current protection device comprising two PTC material layers 10 (i.e., Example II in Table 2), whose manufacturing method is given as follows. Two conductive composite modules 9 are provided first. Second, the metal foils 22' and 23' in each conductive composite module 9 are etched to form etching lines. Third, a first insulated layer 30 (in Example II, the epoxy resin containing glass fiber is used) is applied to the metal foils 22' and 23' and is applied between the two conductive composite modules 9. Then, a copper foil (not shown) is placed on the top surface of the upper insulated is layer 30 and another copper foil (not shown) is applied to the bottom surface of the lower insulated layer 30. A thermal pressing is performed at 60 kg/cm$^2$, 180° C. for 30 minutes. After cooling, a multi-layered composite material layer comprising two PTC material layers 10 is formed. Next, the copper foil on each first insulated layer 30 is etched to from a first metal is electrode 41' and a second metal electrode 42'. After that, a first metal conductor 51' and a second metal conductor 52' are formed by plating-through-hole, in which the first metal conductor 51' electrically connects the metal foils 22' and the first metal electrodes 41', and the second metal conductor 52' electrically connects the metal foils 23' and the second metal electrodes 42'. Afterward, a second insulated layer 60' (in Example II, a UV-light-curing paint is used) is disposed between the first metal electrode 41' and the second metal electrode 42' to electrically insulate the first metal electrode 41' from the second metal electrode 42'. Accordingly, a multi-layered PTC plate is formed. After curing by UV light, the multi-layered PTC plate is cut according to the covered area of the SMD and the surface-mounted over-current protection device comprising two PTC material layers 10 of the present invention is formed. In other embodiments, the first insulated layer 30 between the two conductive composite modules 9 can be replaced with the second insulated layer 60' (e.g., UV-light-curing paint). That is, the second insulated layer 60' is disposed between the metal foil 23' of the upper conductive composite module 9 and the metal foil 22' of the lower conductive composite module 9.

In addition, each of Example III and Comparative Example II comprises four PTC material layers (equivalent to four conductive composite modules); the manufacturing method thereof is similar to that of Example II and is skipped here.

From Table 2, the values of the hold current per unit covered area per PTC material layer (i.e., Ih/(Area×N)) of Examples I to V are above 0.16 A/mm$^2$, which is far above those of Comparative Examples I and II in which the carbon black is used as the conductive filler. With higher loading of the conductive filler in the PTC system, the value of (Ih/(Area×N)) could reach at most 1 A/mm$^2$.

To achieve an over-current protection at low temperature (e.g., to protect lithium batteries from over charge), a general PTC over-current protection device must trip at a lower temperature. Therefore, the [TPC] *PTC* material layer used in the surface-mounted over-current protection device of the present invention can contain a traditional crystalline polymer with a lower melting point (e.g., LDPE) or can contain at least one crystalline polymer, in which the crystalline polymer comprises at least one polymer with a melting point below 115° C. The above LDPE can be polymerized using Ziegler-Natta catalyst, Metallocene catalyst or other catalysts, or can be copolymerized by vinyl monomer or other monomers such as butane, hexane, octene, acrylic acid, or vinyl acetate. Sometimes, to achieve an over-current protection at high temperature or to meet a specific purpose, the compositions of the PTC material layer can totally or partially use crystalline polymers with high melting points; e.g., PVDF (polyvinylidene fluoride), PVF (polyvinyl fluoride), PTFE (polytetrafluoroethylene), or PCTFE (polychlorotrifluoroethylene).

The above crystalline polymers can also comprise a functional group such as an acidic group, an acid anhydride group, a halide group, an amine group, an unsaturated group, an epoxide group, an alcohol group, an amide group, a metallic ion, an ester group, and acrylate group, or a salt group. In addition, an antioxidant, a cross-linking agent, a flame retardant, a water repellent, or an arc-controlling agent can be added into the PTC material layer to improve the material polarity, electric property, mechanical bonding property or other properties such as waterproofing, high-temperature resistance, cross-linking, and oxidation resistance.

The metal powder or the conductive ceramic powder used in the present invention could exhibit various types, e.g., spherical, cubic, flake, polygonal, spiky, rod, coral, nodular or filament, and exhibit various shapes e.g., high structure or low structure. In general, conductive fillers with high structure can improve the resistance repeatability of PTC material, and conductive fillers with low structure can improve the voltage endurance of PTC material.

In other embodiments of the present invention, the conductive filler with lower conductivity, e.g., carbon black or graphite, can be mixed with conductive filler with higher conductivity, e.g., metal powder or conductive ceramic powder as long as the mixture (i.e., the mixed conductive filler) exhibits a resistivity below 0.2 Ω-cm and the value of the hold current thereof divided by the product of the covered area and the number of the conductive composite modules is at least 0.16 $A/mm^2$ and at most 1 $A/mm^2$.

In addition, the PTC material layer of the surface-mounted over-current protection device of the present invention could comprise a non-conductive filler to enhance the functionality of the present invention. The non-conductive filler of the present invention is selected from: (1) an inorganic compound with the effects of flame retardant and anti-arcing; for example, zinc oxide, antimony oxide, aluminum oxide, silicon oxide, calcium carbonate, boron nitride, aluminum nitride, magnesium sulfate and barium sulfate and (2) an inorganic compound with a hydroxyl group; for example, magnesium hydroxide, aluminum hydroxide, calcium hydroxide, and barium hydroxide. The particle size of the non-conductive filler is mainly between 0.05 μm and 50 μm and the non-conductive filler is 1% to 20% by weight of the total composition of the PTC material layer.

According to the above description, the traditional over-current protection device applied to the small-sized SMDs exhibits insufficient hold current and thus loses many practical applications. The present invention, overcoming the limitation of low hold current of the traditional over-current protection device applied to the small-sized SMDs, presents excellent resistivity (i.e., below 0.2 Ω-cm), voltage endurance (i.e., above 12V), resistance repeatability (i.e., $R_1/R_i$ below 3), and a high hold current (i.e., with a value of Ih/(Area×N) above 0.16 $A/mm^2$). Also, since the area of the surface-mounted over-current protection device of the present invention is smaller, more protection devices in the PTC plate can be produced. As a result, the production cost is reduced and the expected objective of the present invention can be achieved.

The methods and features of this invention have been sufficiently described in the above examples and descriptions. It should be understood that any modifications or changes without departing from the spirit of the invention are intended to be covered in the protection scope of the invention.

What is claimed is:

1. A surface-mounted over-current protection device, comprising: at least one conductive composite module, comprising:

a first metal foil;

a second metal foil; and a PTC material layer stacked between the first metal foil and the second metal foil, exhibiting a resistivity below 0.2 Ω-cm, comprising at least one crystalline polymer and at least one conductive filler distributed in the at least one crystalline polymer and exhibiting a resistivity below 500 μΩ-cm;

a first metal electrode electrically connected to the first metal foil;

a second metal electrode electrically connected to the second metal foil; and at least one first insulated layer disposed between the first metal electrode and the second metal electrode to electrically insulate the first metal electrode from the second metal electrode; wherein the surface-mounted over-current protection device, at 25° C., indicates that the value of a hold current thereof divided by the product of a covered area thereof and the number of the conductive composite module is from [0.16] *0.215* $A/mm^2$ to 1 $A/mm^2$.

2. The surface-mounted over-current protection device of claim 1, further comprising a first metal conductor electrically connecting the first metal foil to the first metal electrode.

3. The surface-mounted over-current protection device of claim 1, further comprising a second metal conductor electrically connecting the second metal foil to the second metal electrode.

4. The surface-mounted over-current protection device of claim 1, wherein the at least one crystalline polymer comprises polyethylene.

5. The surface-mounted over-current protection device of claim 1, wherein the conductive filler is a metal powder or a conductive ceramic powder.

6. The surface-mounted over-current protection device of claim 5, wherein the metal powder is nickel*, copper, iron, tin, lead, silver, gold, platinum, or an alloy thereof.*

7. The surface-mounted over-current protection device of claim 5, wherein the conductive ceramic powder is *selected from the group consisting of* titanium carbide*, tungsten carbide, vanadium carbide, zirconium carbide, niobium carbide, tantalum carbide, molybdenum carbide, hafnium carbide, titanium boride, vanadium boride, zirconium boride, niobium boride, molybdenum boride, hafnium boride, and zirconium nitride*.

8. The surface-mounted over-current protection device of claim 1, wherein the particle size distribution of the at least one conductive filler consisting essentially of 0.1 μm to 10 μm.

*9. The surface mounted over-current protection device of claim 1, wherein the PTC material layer has a thickness of greater than 0.2 mm.*

*10. The surface mounted over-current protection device of claim 1, wherein the first metal electrode and the second metal electrode are disposed on one surface of the conductive composite module.*

*11. The surface mounted over-current protection device of claim 1, wherein the first metal electrode and the second metal electrode are disposed on opposite surfaces of the conductive composite module.*

*12. The surface mounted over-current protection device of claim 1, wherein the at least one crystalline polymer comprises high density polyethylene, low density polyethylene, polyvinylidene fluoride, polyvinyl fluoride, polytetrafluoroethylene, polychlorotrifluoroethylene, or the mixture thereof.*

*13. The surface-mounted over-current protection device of claim 1, further comprising non-conductive filler selected*

*from the group consisting of zinc oxide, antimony oxide, aluminum oxide, silicon oxide, calcium carbonate, boron nitride, aluminum nitride, magnesium sulfate, barium sulfate, magnesium hydroxide, aluminum hydroxide, calcium hydroxide, and barium hydroxide.*

*14. The surface mounted over-current protection device of claim 13, wherein the PTC material layer is capable of withstanding a voltage over 12 volts.*

*15. A surface-mounted over-current protection device, comprising:*

*a first conductive composite module, comprising:*

*a first metal foil;*

*a second metal foil; and*

*a PTC material layer stacked between the first metal foil and the second metal foil, exhibiting a resistivity below 0.2 Ω-cm, comprising at least one crystalline polymer and at least one conductive filler distributed in the at least one crystalline polymer and exhibiting a resistivity below 500 μΩ-cm;*

*a second conductive composite module of the same structure and material of the first conductive composite module and being superimposed on the first conductive composite module;*

*a first metal electrode electrically connected to the first metal foil; and*

*a second metal electrode electrically connected to the second metal foil;*

*wherein the first metal electrode is insulated from the second metal electrode;*

*wherein the surface-mounted over-current protection device, at 25° C. indicates that the value of a hold current thereof divided by the product of two and a covered area thereof is from 0.215 A/mm$^2$ to 1 A/mm$^2$.*

*16. The surface-mounted over-current protection device of claim 15, wherein a pair of first insulated layers are disposed on the first and second conductive composite modules and between the first metal electrode and the second metal electrode to electrically insulate the first metal electrode from the second metal electrode.*

*17. The surface-mounted over-current protection device of claim 16, wherein a second insulated layer is disposed between the first conductive composite module and the second conductive composite module.*

*18. The surface-mounted over-current protection device of claim 15, wherein the conductive filler is nickel, copper, iron, tin, lead, silver, gold, platinum, or an alloy thereof.*

*19. The surface-mounted over-current protection device of claim 15, wherein the conductive filler is selected from the group consisting of titanium carbide, tungsten carbide, vanadium carbide, zirconium carbide, niobium carbide, tantalum carbide, molybdenum carbide, hafnium carbide, titanium boride, vanadium boride, zirconium boride, niobium boride, molybdenum boride, hafnium boride, and zirconium nitride.*

* * * * *